United States Patent [19]

Mizuta

[11] Patent Number: 5,131,091
[45] Date of Patent: Jul. 14, 1992

[54] MEMORY CARD INCLUDING COPY PROTECTION

[75] Inventor: Masaharu Mizuta, Itami, Japan

[73] Assignee: Mitsubishi Denki Kabushiki Kaisha, Japan

[21] Appl. No.: 322,993

[22] Filed: Mar. 14, 1989

[30] Foreign Application Priority Data

May 25, 1988 [JP] Japan .................. 63-127330

[51] Int. Cl.⁵ ................................ G06F 12/14
[52] U.S. Cl. .................... 395/725; 364/DIG. 1; 364/286.6; 364/243.3; 364/259.1
[58] Field of Search ... 364/200 MS File, 900 MS File; 395/725, 700

[56] References Cited

U.S. PATENT DOCUMENTS

| 4,465,901 | 8/1984 | Best | 364/200 |
| 4,558,176 | 12/1985 | Arnold et al. | 364/900 X |
| 4,573,119 | 2/1986 | Westheimer | 364/200 |
| 4,584,665 | 4/1986 | Vrielink | 364/900 |
| 4,593,353 | 6/1986 | Pickholtz | 364/200 |
| 4,685,055 | 8/1987 | Thomas | 364/200 |
| 4,685,056 | 8/1987 | Barnsdale, Jr. et al. | 364/200 |
| 4,740,890 | 4/1988 | William | 364/200 |
| 4,879,645 | 11/1989 | Tamada et al. | 364/200 |

Primary Examiner—Thomas M. Heckler
Attorney, Agent, or Firm—Leydig, Voit & Mayer

[57] ABSTRACT

Data for protecting software is written into a ROM for protecting software in an IC card including other ROMs for storing data and scrambled software. The data for protecting software provides a key for execution of the software. A read-write RAM is responsive to the same select signal that is applied to the software protecting ROM for reading and writing of data by a user. When the data of the software protecting ROM is read out, the outputs of the ROM and the RAM are exclusive-OR gated. Accordingly, it is impossible to easily know what software protection data has been written into the ROM, i.e., to decode the software key. The ROM, the RAM, and the data processing circuit may be constructed as one IC.

9 Claims, 4 Drawing Sheets

| INPUT 1 | INPUT 2 | OUTPUT |
|---------|---------|--------|
| 0 | 0 | 0 |
| 0 | 1 | 1 |
| 1 | 0 | 1 |
| 1 | 1 | 0 |

MEMORY CARD INCLUDING COPY PROTECTION

BACKGROUND OF THE INVENTION

1. Field of the Invention

The present invention relates to a memory card which includes memory devices such as a RAM and a ROM for storing data or software.

2. Description of the Related Art

Illegal copying is a serious problem to software suppliers. However, in the present situation in which floppy disks are usually employed to supply software, software suppliers find it difficult to take active measures to prevent illegal copying when the convenience of many authorized users is taken into account. This is because users need to copy software from floppy to RAM disks or hard disks and because back-up copies are needed because of the low access reliability of floppy disks.

As is known, memory cards which include semiconductor memory ICs such as RAMs and ROMs have access speed and access reliability, both of which are extremely high compared with those of hard disks. For this reason, even if active measures to prevent illegal copying are incorporated into memory cards in which software is stored, authorized users will not suffer inconvenience. Accordingly, if the feature of such a memory card, that is, the incorporation of measures to prevent easy illegal copying, is emphasized in contrast to the problem, of floppy disks it will be possible to provide a stepping stone to the enlargement of the range of applications of memory cards.

FIG. 1 is a block diagram of a protection system for use with software which is supplied by means of a conventional type of floppy disk. As illustrated, a floppy disk 2 in which coded or scrambled software is stored is connected to a personal computer 1 by a signal line 3. A software protecting device 4 available under the tradename of "PROTECT BOX" or "LOCK STAR" is connected to the personal computer 1 by a signal line 5. The signal line 5 is an input/output signal line according to the RS232C or CENTRONICS interface standard, which enables the protecting device 4 to be easily connected to the personal computer 1. The operation of the software is possible only when the protecting device 4 is connected to the personal computer 1. If the personal computer 1 detects the disconnection of the protecting device 4 during the operation of the software, the personal computer 1 interrupts the execution of the software.

FIG. 2 is a block diagram showing the construction of an internal basic circuit of a conventional IC memory card (ROM card), described in "IC Memory Card Guideline" (issued in September, 1986) compiled by the personal computer work committee of *Nippon Denshi Kogyo Shinko Kyokai* (Japan Electronic Industry Promoting Association, an incorporated body). In FIG. 2, a memory chip section 8 is normally composed of a plurality of ROM chips (refer to FIG. 3). An interface connector 6 is a connector for providing a connection with an external device. A low-order address bus 11 and a data bus 12 which extend from the interface connector 6 are connected directly to each memory chip in the memory chip section 8. A chip select circuit 7 serves to select a specified memory chip in the memory chip section 8, and a control bus 9 and a high-order address line 10 which extend from the interface connector 6 are connected to the chip select circuit 7. An external power source line 13 for supplying electrical power from a power source (not shown) disposed outside the memory card is connected to both the memory chip section 8 and the chip select circuit 7.

FIG. 3 is a block diagram showing in greater detail the memory chip section 8 and the chip select circuit 7 both of which are particularly associated with the present invention in the block diagram of FIG. 2. In FIG. 3, like reference numerals are used to denote like or corresponding portions shown in FIG. 2. As illustrated, the chip select circuit 7 is constituted by, for example, a general-purpose gate IC "74HC138", while each ROM chip 81 and 82 is a ROM chip, such as "27C256", each having a storage capacity of 32K bytes. A card select line [$\overline{CE}$] 91 which serves to select a particular memory card and place it in an enable state extends from the interface connector 6 (refer to FIG. 2)to the chip select circuit 7. Chip select lines [$\overline{S1}$, $\overline{S2}$] 93 and 94 extend from the chip select circuit 7 to the ROM chips 81 and 82, respectively. An output enable control line [$\overline{OE}$] 92 is connected to both the ROM chips 81 and 82. In the arrangement shown in FIG. 3, the high-order address signal of the high-order address line 10 is composed of a 1-bit signal indicative of a high-order address A15 (the number of bits is determined by the number of memory chips constituting the memory chip section), while the low-order address signal of the low-order address bus 11 is composed of a 15-bit signal indicative of low-order addresses A0 to A14 (since the memory capacity of each of the memory chips is 32 k bytes). The data signal provided at a bidirectional data bus 12 is composed of a 8-bit signal corresponding to data lines $D_0$–$D_7$. In FIG. 3, for simplicity of explanation, the memory chip section 8 is shown constituted by the two ROM chips 81 and 82 but, in general, the memory chip section 8 is constituted by an even larger number of memory chips. Even if the number of memory chips is increased, the basic operation of the memory card itself does not change, and the number of high-order address lines 10 and the number of chip select lines 93, 94 extending from the chip select circuit 7 merely increase.

However, since a conventional type of memory card is constructed in the manner described above, there has been a problem in that it is possible to easily read internally stored software into an external device or to easily copy it onto a recording medium such as another floppy disk. Furthermore, in terms of the conventional circuit construction, it has been difficult to incorporate measures to prevent copying.

SUMMARY OF THE INVENTION

It is, therefore, an object of the present invention to provide a memory card which solves the above-described problems and which prevents copying of software by means of a simple additional circuit.

To this end, in accordance with the present invention, there is provided a memory card which has, in addition to ROMs for storing data or software, a ROM in which data or the like for protecting software is written in advance, a RAM responsive to the same chip select signal that is applied to the above ROM for operating and allowing arbitrary writing of data by a user, and a data processing circuit arranged to perform exclusive-OR gating of the outputs of the ROM and the RAM and then to output processed data for use in making a decision as to the data written in advance in the ROM.

The additional ROM has previously written data or the like for protecting software. In response to the same chip select signal that is applied to the above additional ROM, the RAM operates and effects writing of the data supplied from the user. When the data in the ROM is read out to the exterior of the memory card, the data processing circuit performs exclusive-OR gating of the outputs of the ROM and the RAM and outputs the processed data. Accordingly, the contents of the data in the ROM cannot be understood if the data in the ROM is only read out. The contents of processed data which are the output of the data processed circuit varies in response to the contents of the data in the RAM which is written by the user. Consequently, when the data or program in the memory card is read out and copied to, for example, a floppy disk, contents in the ROMs other than the above additional ROM are copied accurately but the contents in the additional ROM are not copied accurately, so that, an accurate execution of the program copied to the floppy disk is prevented.

DESCRIPTION OF THE PREFERRED EMBODIMENT

A preferred embodiment of the present invention will be described below in detail with reference to the accompanying drawings.

Figure 1:
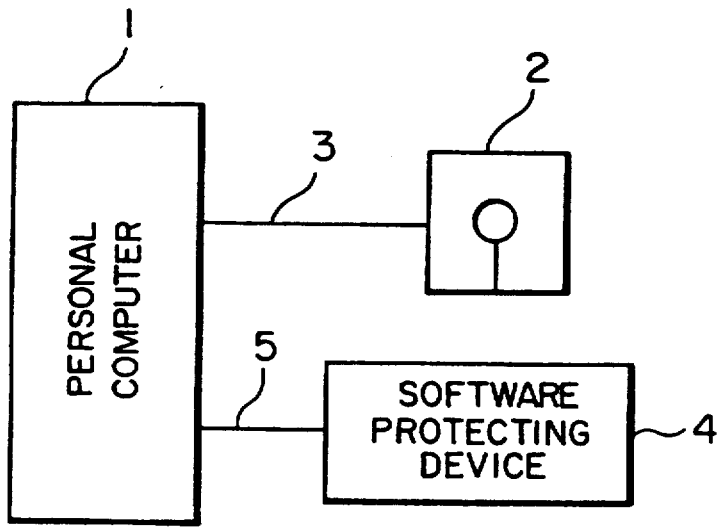
FIG. 1 is a block diagram showing the construction of a software protecting system for use with a conventional floppy disk.
Figure 2:
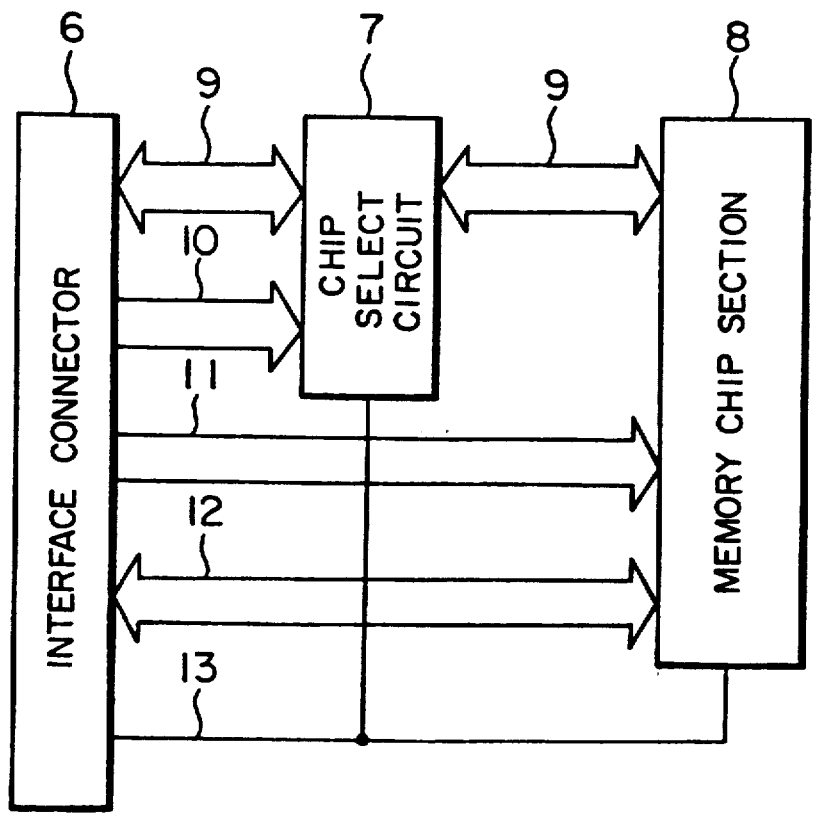
FIG. 2 is a block diagram diagrammatically showing the internal construction of a conventional memory card.
Figure 3:
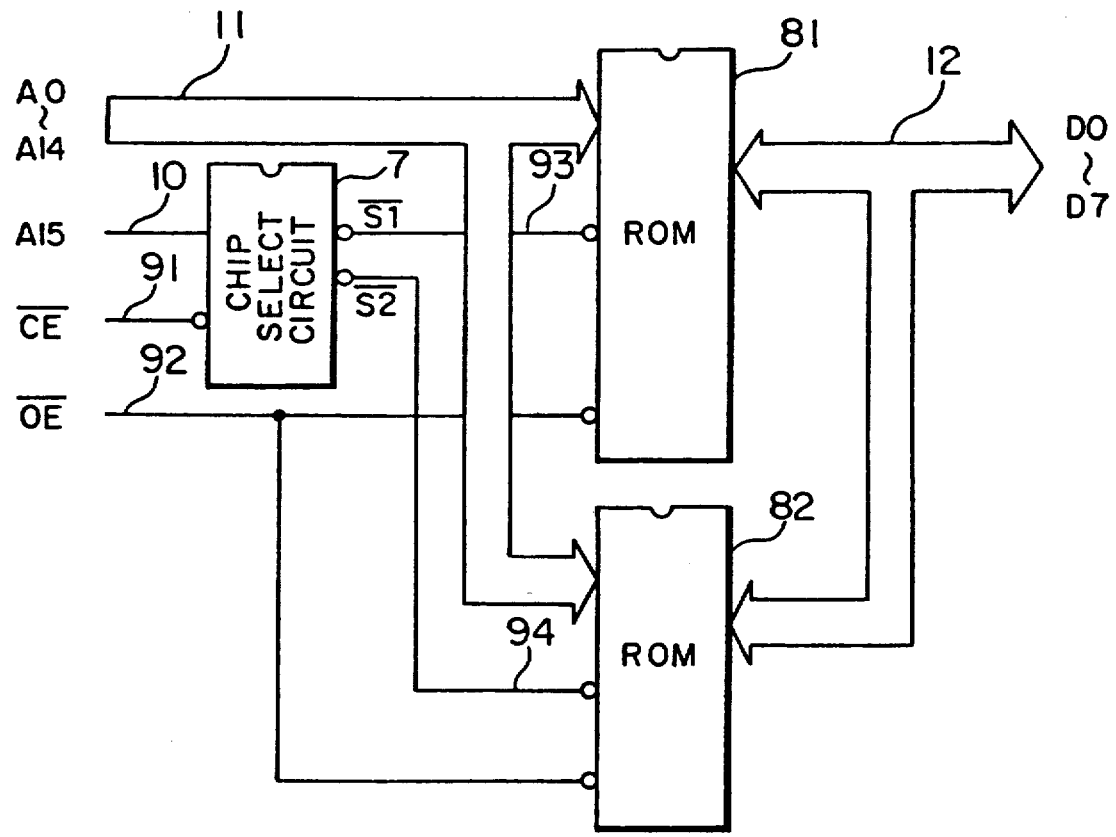
FIG. 3 is a block diagram showing the details of the construction of the memory chip of FIG. 2.
Figure 4:
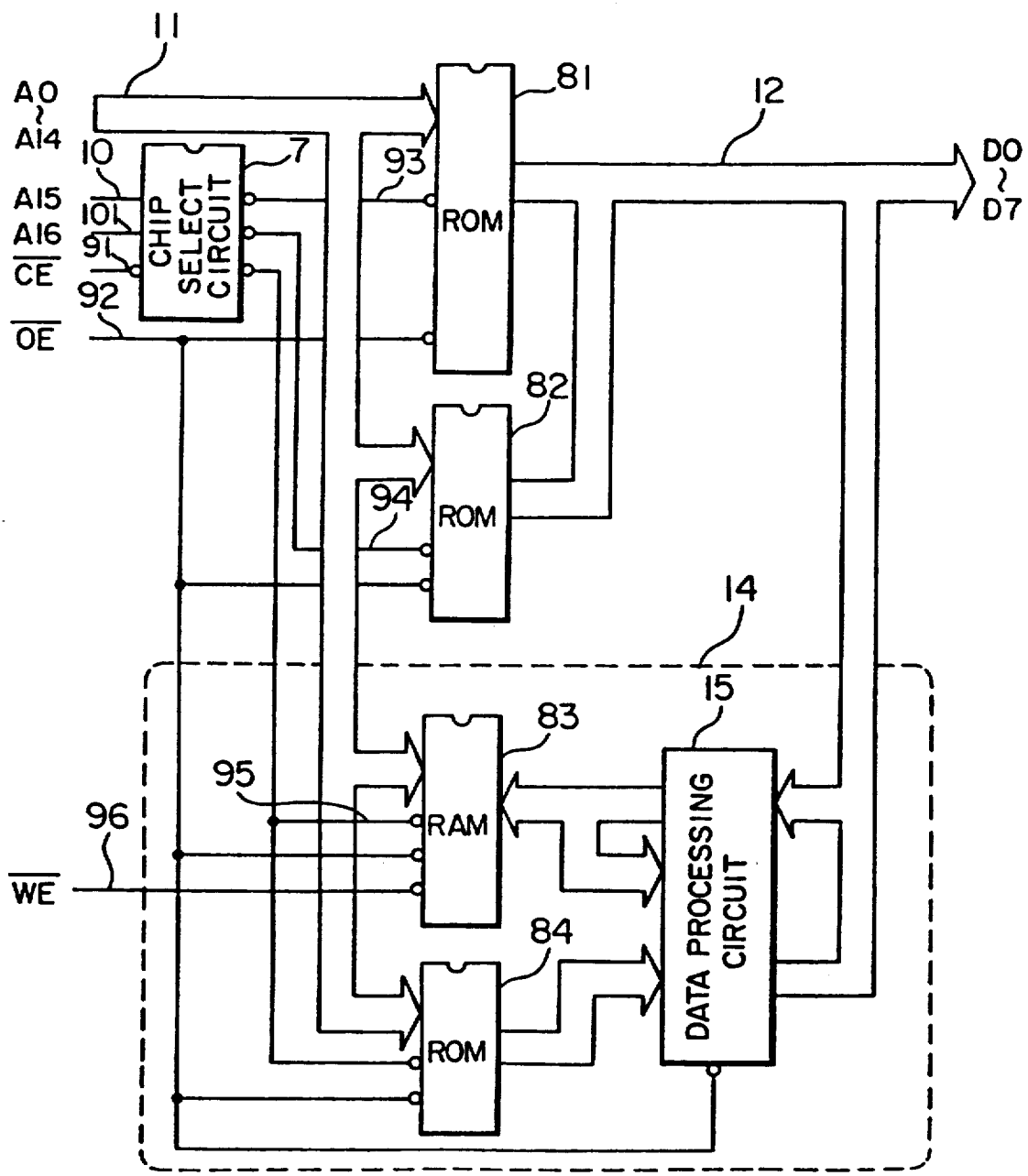
FIG. 4 is a block diagram showing the internal construction of a memory card according to an embodiment of the present invention.

FIG. 4 is a block diagram showing the internal construction of a memory card according to the preferred embodiment of the present invention. In FIG. 4, like reference numerals are used to denote like or corresponding elements shown in FIG. 3, and the description thereof is omitted. In FIG. 4, a ROM 84 is a ROM in which data for protecting software is written in advance. A RAM 83 is a RAM which is responsive to the same chip select signal that is applied to the ROM 84 for operating and allowing arbitrary writing of data by a user. A data processing circuit 15 is arranged for exclusive-OR gating of the outputs of the ROM 84 and the RAM 83 and then to output processed data for use in making a decision as to the data written in advance in the ROM 84. The RAM 83, the ROM 84 and the data processing circuit 15 constitute a protection circuit 14. A chip select line 95 transmits a chip select signal $\overline{S3}$ from a chip select circuit 7 to the RAM 83 and the ROM 84. A write enable control line [$\overline{WE}$] 96 provides control over the writing of data to the RAM 83. The most significant address line [A16] 101 for an even higher-order address A16 is disposed in correspondence with the chip select line 95 connected to the added memory chips. The ROMs 81 and 82 store in advance scrambled software or the like. The chip select line 95, the low order address bus 11, and an output enable control line [$\overline{OE}$] 92 are connected in common to both the RAM 83 and the ROM 84, but the write enable control line [WE] 96 is connected to the RAM 83 alone. More specifically, when the most significant address line [A16] 101 is in a meaningful state, data is written to the RAM 83 alone, while, in the case of readout from the memory card, data is read from both the RAM 83 and the ROM 84.

Figures 5, 6:
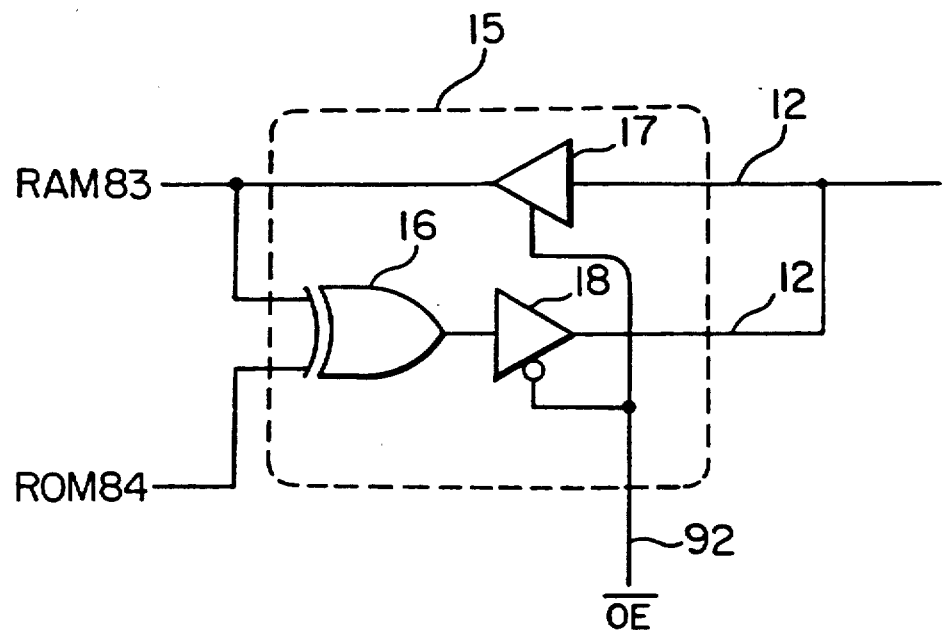
FIG. 5 is a block diagram showing the details of the construction of the data processing circuit of FIG. 4.
FIG. 6 is a truth table stored in an exclusive-OR circuit of FIG. 5.

FIG. 5 shows the details of the construction of the data processing circuit 15 shown in FIG. 4. In FIG. 5, each line 12 represents one signal line among data lines $D_0$–$D_7$ (which constitute the data line 12 shown in FIG. 3). An exclusive-OR circuit 16 is arranged for exclusive-OR gating of the outputs of the RAM 83 and the ROM 84. A first buffer circuit 17 has an output control function and provides the state of its input signal at its output when the output enable control line 92 is in a meaningless state. A second buffer circuit 18 has an output control function and provides the state of its input signal at its output when the above output enable control line 92 is in a meaningful state (significant state). The impedance of each of the buffer circuits 17 and 18 are high under conditions opposite to the above conditions. During writing of data from the data line 12 into the RAM 83, the first buffer circuit 17 conducts electricity, while when the second buffer circuit 18 is conducting electricity, data is read from the RAM 83 and the ROM 84 and supplied to the readout data line 12. The exclusive-OR circuit 16 has the truth values shown in FIG. 6 and requires a combined operation of the RAM 83 and the ROM 84 in order to make a decision as to the state of its input on the basis of the states of logic "0" or logic "1" of its output. More specifically, a decision as to data of logic "0" or "1" can be made from a decision as to the writing of logic "0" or logic "1" to the RAM 83 and a decision as to the output data of logic "0" or logic "1" processed in the data processing circuit 15 during reading of logic "0" or logic "1" from the RAM 83 and the ROM 84.

If the data of the data bus 12 is 8-bit data, data representative of $2^8 = 256$ combinations of logic "0" and logic "1" is written into the RAM 83 a maximum of 256 times and data is read from the RAM 83 and the ROM 84. When the outputs of each exclusive-OR circuit 16 in the data processing circuit 15 becomes logic "0", the data at an address in the ROM 84 can be identified. If the ROM 84 stores in advance 256-byte data as electronic keys for decoding scrambled software, a user who does not know such a value (electric keys) know will have to repeat writing and reading operations by 65,536 times (=256 (times)×256 (bytes)) in order to find the data (electric keys). However, a software supplier who knows such a value has only to perform writing and reading operations 256 times. The software suiplier can alter the contents of these 256 bytes for each kind of software, each version, or each user who purchases the software. More specifically, since each memory card has scrambled software different from the software stored in another memory card, it is impossible for users to easily know the data in the ROM 84. In addition, it is impossible to decode the scrambled software in the ROMs 81 and 82, copy the decoded software onto a floppy disk or a hard disk and execute it.

In the above-described embodiment, a protect box for protecting software which is stored in advance is formed as an IC and is accommodated in the memory card, and the contents of the protecting IC cannot be easily accessed externally. Accordingly, it is possible to prevent the copying of the software.

As described above, by exclusive-OR gating of the outputs of the ROM 84 and the RAM 83 by the exclusive-OR circuit 16, it is possible to prevent the contents of the data in the ROM 84 from being easily accessed externally. This is because the contents of the ROM 84 are made opaque by the data processing circuit 15, that is, the meaning of the contents cannot be understood if the contents are only read out. As can be seen from the truth table of the exclusive-OR circuit 16 shown in FIG. 6, when both inputs 1 and 2 are "1", the output is not "1" but "0". Therefore, it is impossible to immediately determine what the original data is. By contrast, when a person who knows in advance the correct data in the ROM 84 and reads out the data of the ROM 84, he can prepare the data stored in the RAM 83. More specifically, the protecting circuit 14 is a circuit which is useful also when a user employs the memory card which includes the ROM 84 and the RAM 83. Data to be written into the ROM 84 for protecting purposes is data which is not desired to be easily read from the memory card for viewing or copying purposes, for example, a personal identification number and so forth.

The above embodiment has been described with reference to the example in which each of the memory chips 81 and 82 is constituted by a ROM. However, the memory chips 81 and 82 may be RAMs in which data can be written and, with this arrangement, it is also possible to provide effects and advantages similar to those of the above-described embodiment. In the above description of the embodiment, it has been stated that the constituent elements of the protecting IC 14 are constructed with discrete ICs. However, the protecting IC 14 may be constituted by one monolithic IC or a gate array. This arrangement is very effective in that, even if the memory card is disassembled, it is impossible to directly know the output data of the memory chip ROM 84. Furthermore, in the above description of the embodiment, it is assumed that the data width of the RAM 83 and the ROM 84 which constitute memory chips is 8 bits and that the number of bits of an input to the exclusive-OR circuit 16 in the data processing circuit 15 is eight. If the number of bits is increased to 16 bits or 32 bits, the number of testings for decoding software increases by several times and, therefore, the effect of protecting software is further enhanced.

As described above, the memory card according to the present invention is provided with, in addition to ROMs for storing data or software, a ROM in which data or the like for protecting software is written in advance, a RAM responsive to the same chip select signal that is applied to the above ROM for operating and allowing arbitrary writing of data by a user, and a data processing circuit for exclusive-OR gating of the outputs of the ROM and the RAM and for outputting processed data for use in making a decision as to the data written in advance in the ROM. Accordingly, it is possible to prevent the copying of software by means of a simple circuit, for example, without adding any special device to a personal computer. It is, therefore, possible to provide a memory card having an inexpensive software protection function.

What is claimed is:

1. A memory card comprising:
   system bus means for signal transfer;
   software storing means connected to said system bus means for storing data and at least one computer program, i.e., software, and for outputting the stored data and software to the system bus means in response to a read signal;
   selecting means for generating a chip select signal;
   software protecting memory means connected to said selecting means and said system bus means for storing software protecting data and for outputting to said system bus means said software protecting data in response to the chip select signal;
   read-write memory means connected to said selecting means and said system bus means responsive to the chip select signal for storing read-write data received from the system bus; and
   data processing means connected to said system bus means for exclusive-OR gating of the read-write data output from said read-write memory means and said software protecting data output from said software protecting memory means to produce processed data, and for outputting the processed data to the system bus means whereby the software protecting data stored in said software protecting memory means may be obtained.

2. A memory card according to claim 1 wherein said software storing means comprises at least one ROM, said software protecting memory means comprises at least one ROM, said read-write memory means comprises at least one RAM, said selecting means comprises a chip select circuit for decoding a select signal to generate the chip select signal for access to one of said software storing means, said read-write memory means, and said software protecting memory means, and said data processing means comprises an exclusive-OR gate for gating the data output by said read-write memory means and said software protecting memory means.

3. A memory card according to claim 2 wherein each of said software protecting memory means, said read-write memory means and said data processing means comprises discrete ICs.

4. A memory card according to claim 2 wherein said software protecting memory means, said read-write memory means and said data processing means are constituted by a single IC.

5. A memory card according to claim 2 wherein said software protecting memory means, said read-write memory means and said data processing means comprises a single gate array IC.

6. A memory card according to claim 1 wherein said data processing means comprises an exclusive-OR gate for exclusive-OR gating of data output by said read-write memory means and by said software protecting means; a first buffer circuit having an input and an output for providing the state of its input at its output only when a control signal is in a first of two possible states; and a second buffer circuit having an input and an output for providing the state of its input at its output only when the control signal is in a second of the two possible states, the output of said first buffer circuit being connected to said read-write memory means for storing data in said read-write memory means and the input of said second buffer circuit receiving data produced by said exclusive-OR gate for outputting data from said software protecting memory means and said read-write memory means.

7. A memory card according to claim 1 wherein said memory card employs 8-bit data.

8. A memory card according to claim 1, wherein said memory card employs 16-bit data.

9. A memory card according to claim 1, wherein said memory card employs 32-bit data.

* * * * *